(12) United States Patent
Westmeyer et al.

(10) Patent No.: US 10,343,258 B2
(45) Date of Patent: Jul. 9, 2019

(54) HYBRID ROTATING-GYRATING DEVICE

(71) Applicants: Paul Westmeyer, Lancaster, PA (US);
Renee Mazaheri, Lancaster, PA (US)

(72) Inventors: Paul Westmeyer, Lancaster, PA (US);
Renee Mazaheri, Lancaster, PA (US)

( * ) Notice: Subject to any disclaimer, the term of this patent is extended or adjusted under 35 U.S.C. 154(b) by 0 days.

(21) Appl. No.: 15/906,244

(22) Filed: Feb. 27, 2018

(65) Prior Publication Data
US 2018/0250792 A1    Sep. 6, 2018

Related U.S. Application Data

(60) Provisional application No. 62/466,392, filed on Mar. 3, 2017.

(51) Int. Cl.
*F41B 3/04*    (2006.01)
*B24C 5/00*    (2006.01)
*F16H 21/14*   (2006.01)

(52) U.S. Cl.
CPC ............ *B24C 5/00* (2013.01); *F16H 21/14* (2013.01); *F41B 3/04* (2013.01)

(58) Field of Classification Search
CPC .................................. F41B 3/00; F41B 3/04
See application file for complete search history.

(56) References Cited

U.S. PATENT DOCUMENTS

| | | | | |
|---|---|---|---|---|
| 1,408,137 A * | 2/1922 | Parsons | | F41B 3/04 124/6 |
| 2,684,062 A * | 7/1954 | Rose | | A62C 99/009 124/6 |
| 5,857,451 A * | 1/1999 | Ciluffo | | A63B 69/0026 124/6 |
| 5,950,608 A * | 9/1999 | Tidman | | F41B 3/04 124/1 |
| 6,520,169 B1 * | 2/2003 | St. George | | F41B 3/04 124/6 |
| 6,712,055 B1 * | 3/2004 | Tidman | | F41B 3/04 124/1 |
| 7,032,584 B2 * | 4/2006 | Tidman | | F41B 3/04 124/1 |
| 7,497,211 B2 * | 3/2009 | St. George | | F41B 3/04 124/6 |
| 7,500,477 B2 * | 3/2009 | Westmeyer | | E21B 7/00 124/6 |
| 7,950,379 B2 * | 5/2011 | Tidman | | F41B 3/04 124/1 |
| 8,820,303 B2 | 9/2014 | Westmeyer | | |
| 2005/0249576 A1 * | 11/2005 | Westmeyer | | E21B 7/00 414/1 |

* cited by examiner

*Primary Examiner* — John A Ricci
(74) *Attorney, Agent, or Firm* — Schaffer, Schaub & Marriott L.T.D.

(57) ABSTRACT

Combining rotating and gyrating structures, to achieve a specific velocity of a mass, within a device, can reduce the number of parts as compared to a design using only gyration induced acceleration, and can reduce the absolute dimensions compared to a design using only rotation induced acceleration. Synchronous motions allow the accelerated mass to transition from a rotating reference frame to a gyrating reference frame without a significant physical gap or jump, greatly reducing any potential for ricochet. Rephasing within the device may be accomplished several times. The mass is ejected and directed toward a target.

11 Claims, 7 Drawing Sheets

Cross-section of Gyrating Cylinder & Rotating Tube with Pillow Block Bearings

Cross section of Gyrating Bowl & Rotating Tube

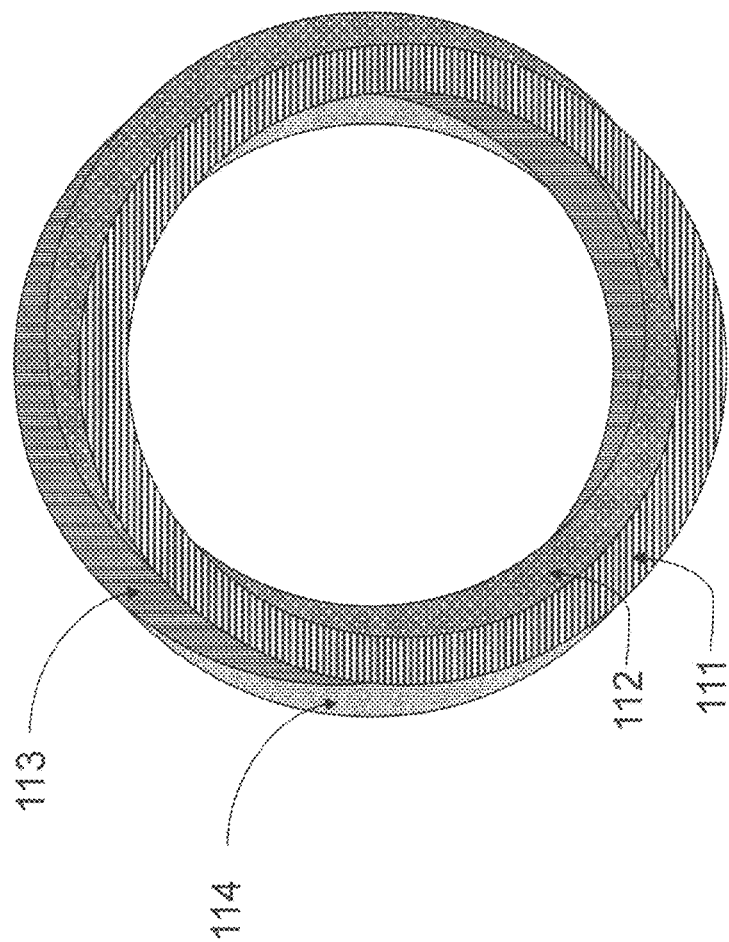
Fig. 1 Dynamic Envelop of Gyrating Annual Ring (Cylinder Cross Section)

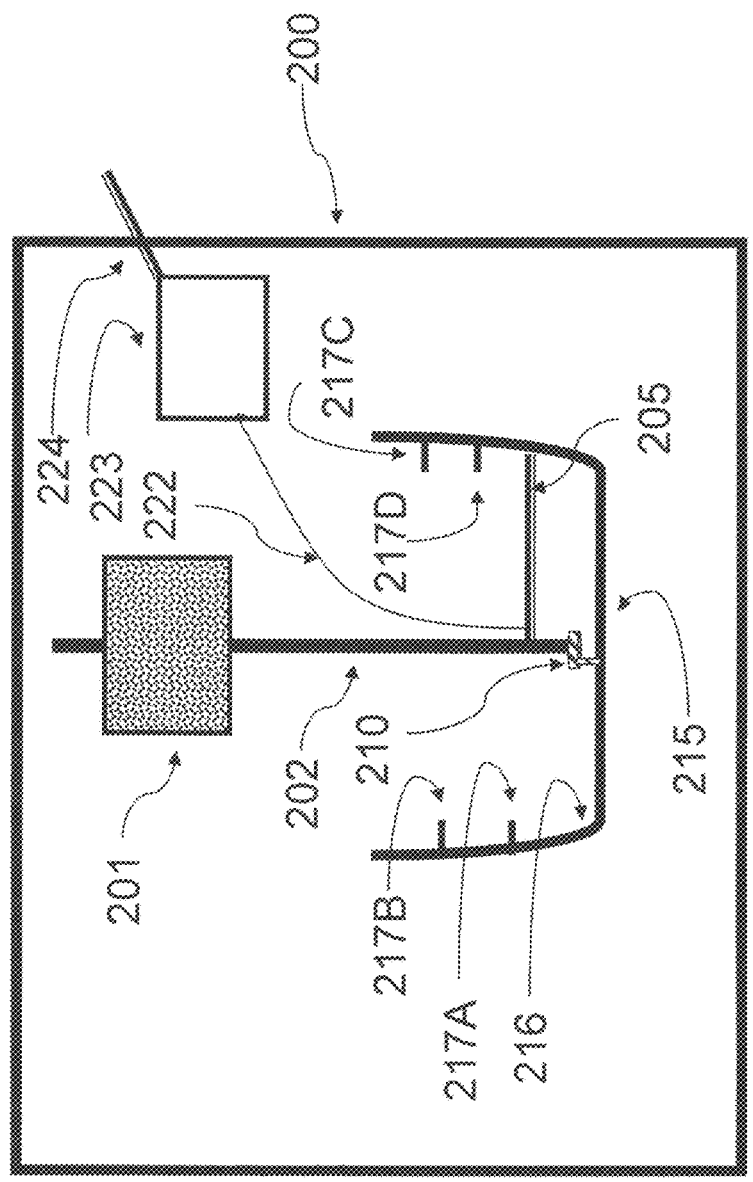
Fig. 2 Cross-section of Gyrating Cylinder & Rotating Tube

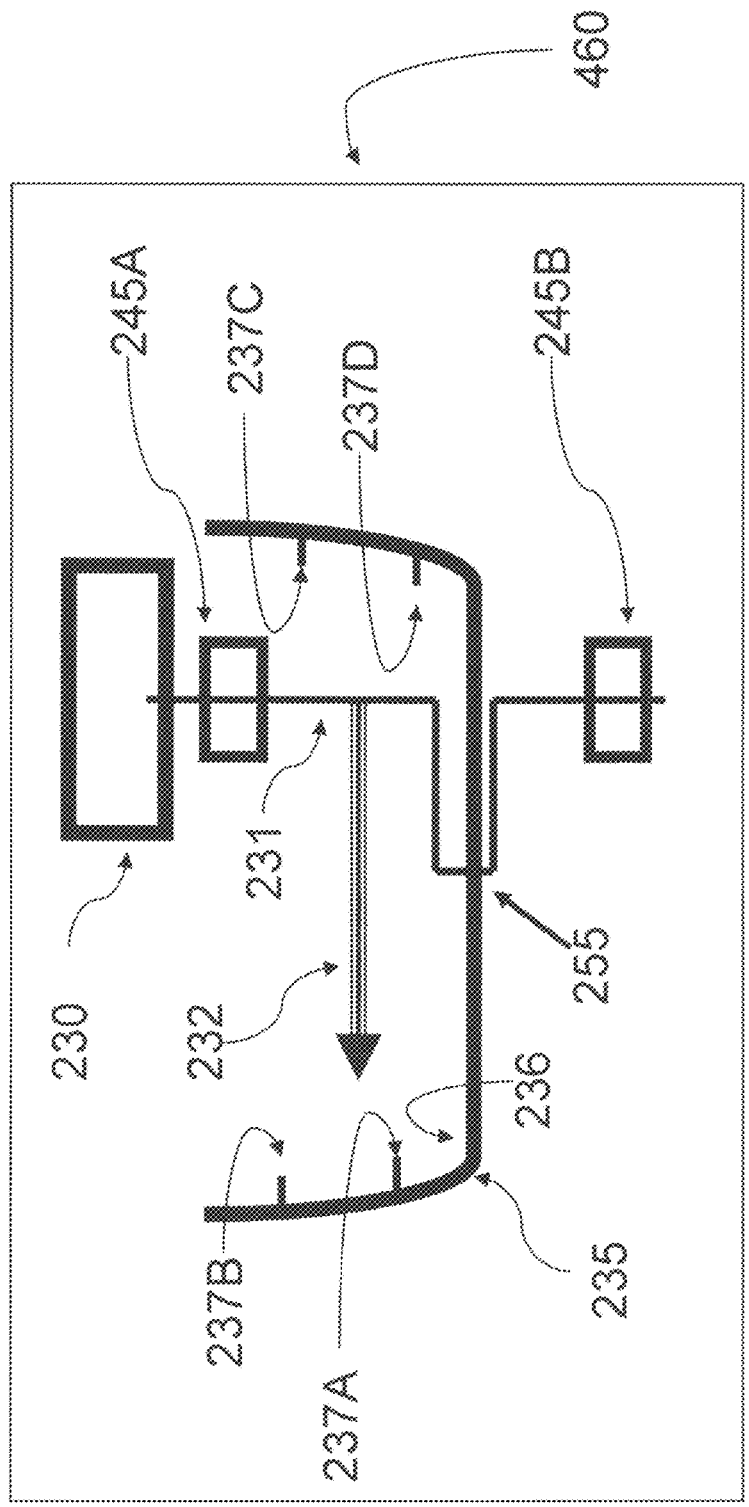
Fig. 2B Cross-section of Gyrating Cylinder & Rotating Tube with Pillow Block Bearings

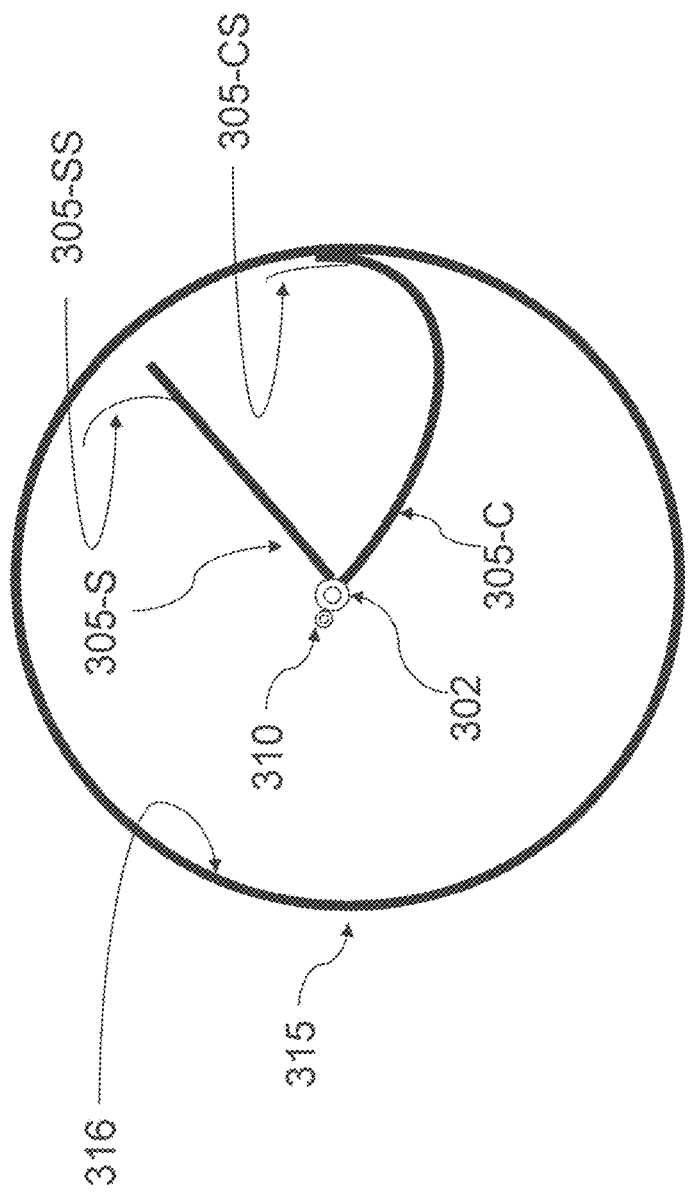
Fig. 3 Air Gap & Ricochet Deflection Plates for Straight and Curved Tubes

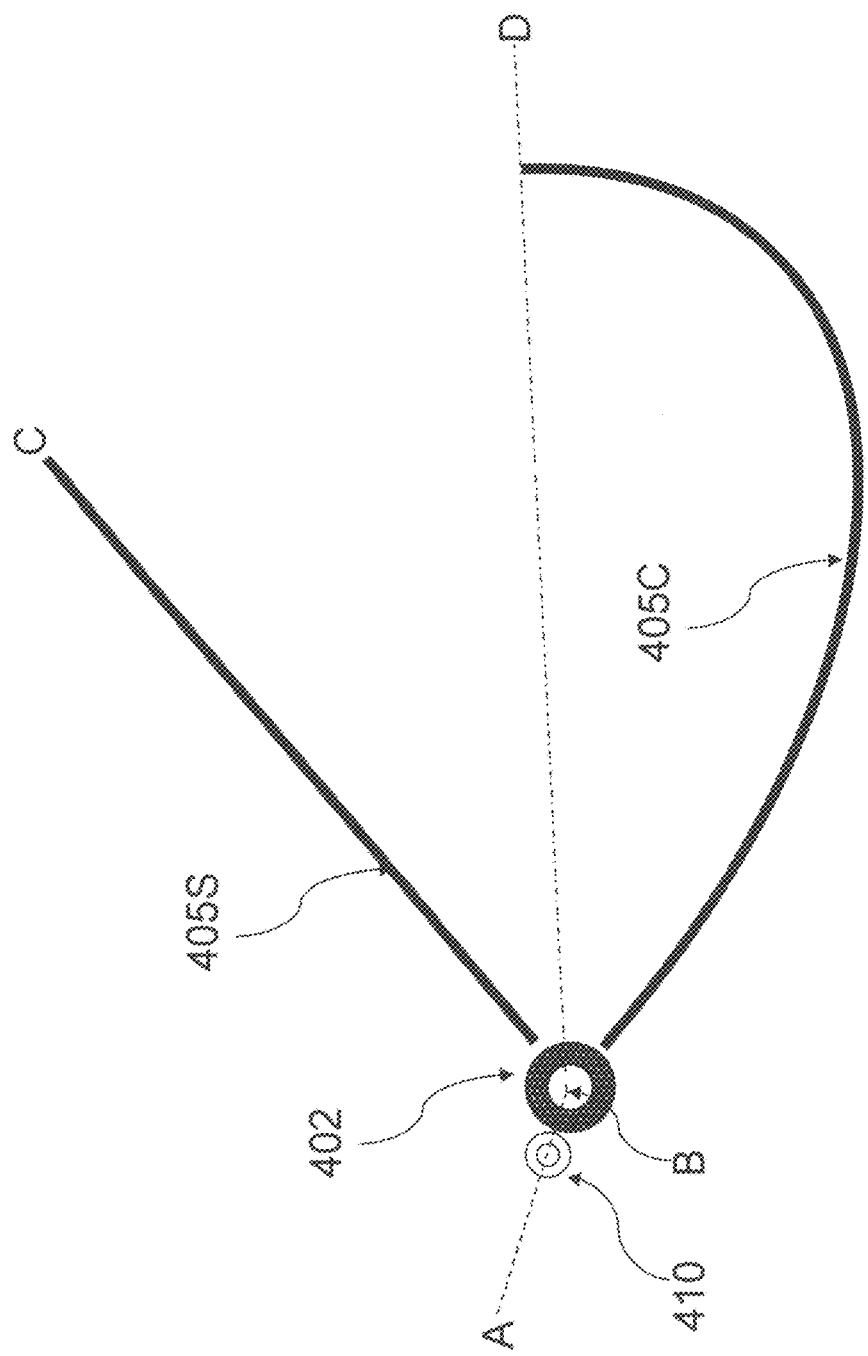
Fig. 4 Angles between Gyration Phase & Tubes Exits

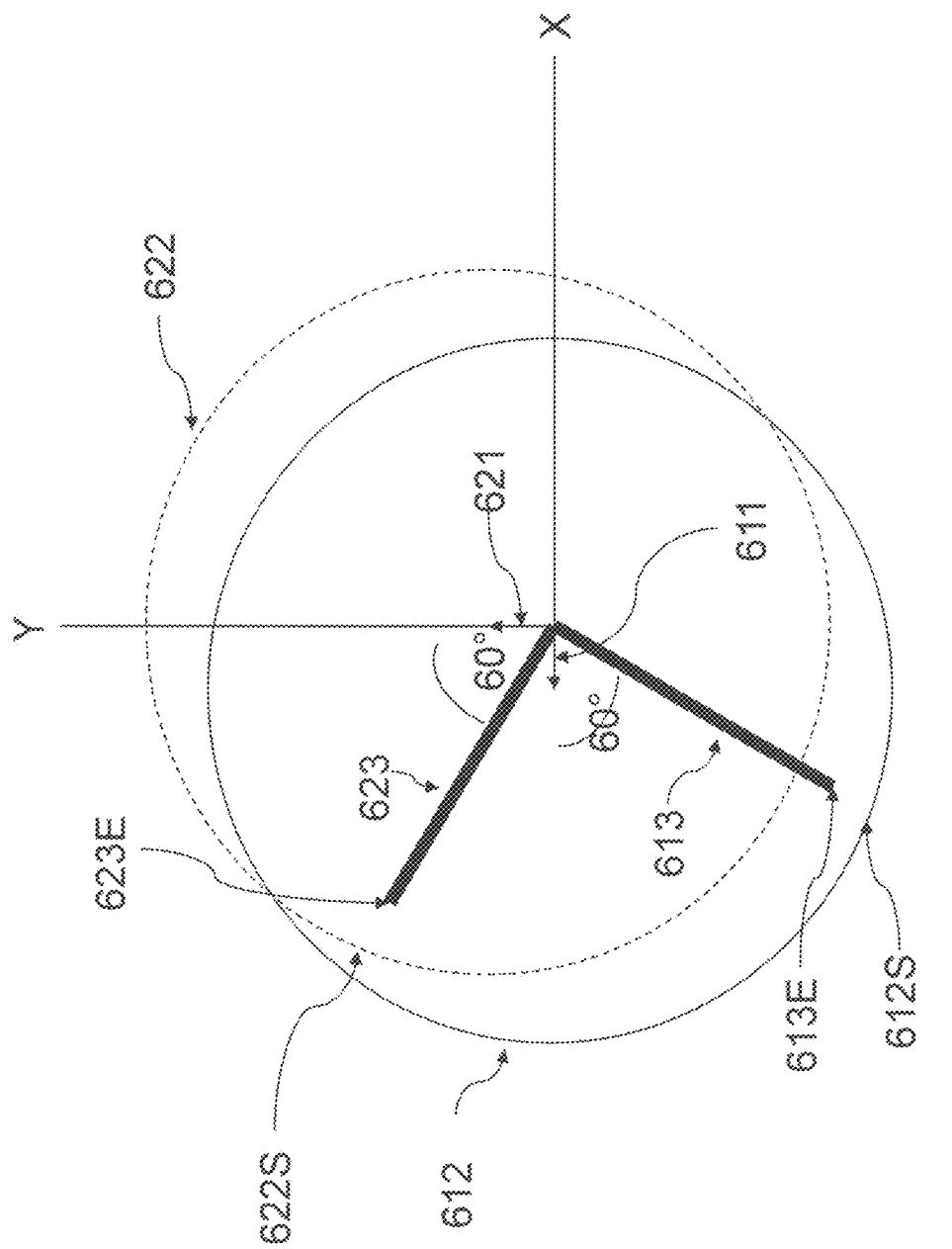
Fig. 4B Fixed Angles & Distance between Gyration Phase & Tube Exit

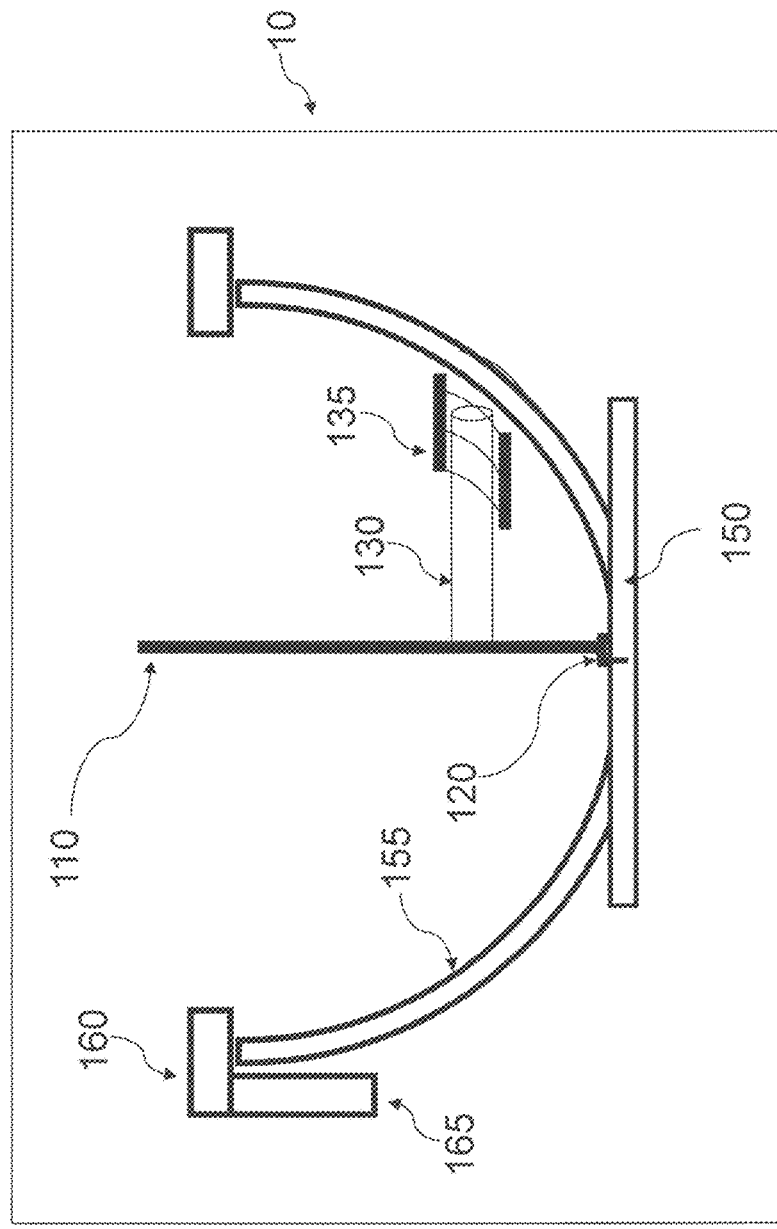
Fig. 5 Cross section of Gyrating Bowl & Rotating Tube

HYBRID ROTATING-GYRATING DEVICE

CROSS REFERENCE TO RELATED APPLICATION

The present application is based upon and claims the benefit of provisional patent application No. 62/466,392 filed on Mar. 3, 2017.

TECHNICAL FIELD

This invention relates to accelerating a mass using a combined Rotating-Gyrating Device. Combining rotating and gyrating structures, to achieve a specific velocity of a mass, within a device, can reduce the number of parts as compared to a design using only gyration induced acceleration, and can reduce the absolute dimensions compared to a design using only relation induced acceleration. Synchronous motions allow the accelerated mass to transition from a rotating reference frame to a gyrating reference frame without a significant physical gap or jump, greatly reducing any potential for ricochet. Re-phasing within the device may be accomplished several times. The mass is ejected and directed toward a target. U.S. Pat. No. 8,820,303B2 dated Sep. 2, 2014 issued to Paul Westmeyer and Renee Mazaheri, is herein incorporated by reference. U.S. patent application Ser. No. 15/430,683 filed on Feb. 13, 2017, in the name of Paul Westmeyer, Robert Woods, and Parker Woods, titled "Acceleration and Precision Controlled Ejection of Mass" is herein incorporated by reference.

BACKGROUND OF THE INVENTION

Many products rely upon impacting mass for abrasion, for coating, cutting, and a wide range of other applications. Pressurized sandblasting, exploding chemical for bullets, and rotating cutting blades are techniques used to accelerate a mass. Our U.S. Pat. No. 8,820,303B2 (referred to as '303'), defines gyration techniques to generals the velocity of a mass for many purposes. A patent application using rotationally induced acceleration has been filed by one of these two inventors. This hybrid configuration is the logical outgrowth of those activities. Two principle goals are driving this invention, simplistic designs and compact packaging.

The number of moving parts in any design defined by '303' is typical for complex machinery. These gyrating designs are defined by: the compactness of the product large number of variables to select from in optimizing for a specific application, and the scalable nature of the design. Variations in gyration-based design parameters, such as number of stages, shapes of stages, radii of gyrations and frequencies of gyrations of various stages, allow for trades to satisfy many applications with a number of options.

Gyration induced acceleration, in '303', has re-phasing as an integral strategy. These re-phasing events generate velocities in excess of the classic phase-lock velocity. Conventional phase-lock velocity, rotating or gyrating, is defined as the path length times the frequency. The Delay Loop concept in the '303' is the technique for re-phasing within a stage; a structure gyrating at a particular frequency with a particular gyration radius. Delay Loop structures are continuations of phasing structures in any single gyrating frequency, 'mechanical detours'. Moving into a new gyrating structure using '303' Service Loop concepts, builds upon the Delay Loop for gaining velocity. Service Loops are true discontinuities in the pathway, allowing major changes in the accelerating structures; shapes, frequency, dimensions, etc.

In the gyrating patent, '303', there am numerous examples wherein the mass, an object being accelerated, is 'detoured' by a Delay Loop (term used in '303'). While in the Delay Loop the mass is not subjected to any significant forces capable of reducing the velocity of the mass. Upon exiting a Delay Loop, the mass is reinserted into a section of the gyrating structure, taking advantage of a new phase relationship between the mass and the accelerating force. An example of re-phasing occurs when a Delay Loop pathway is inserted in a compound shape, a bowl leading into a cylinder with its diameter equal to the bowl's diameter. As the mass may have achieved phase-lock velocity at the bowl's rim, any additional cycles within the cylinder would not yield any additional velocity gains unless the mass can be rephased with respect, to the accelerating force. The Delay Loop is specifically designed to move the mass out of the acceleration plane and allow the mass to reenter the acceleration plane at a phasing favorable to increasing the mass' velocity. In gyration motion the radial force is periodic, thus new phasing can occur at any point, in a particular cycle, and this opportunity repeats itself every cycle. As noted in '303' the limit of velocity gain occurs when the mass's velocity is sufficiently faster than the phase wave velocity and thus the duration of time available to gain additional velocity is too smalt to overcome the losses imparted to the mass by moving out of, and then back into, the accelerating plane of the phase wave.

When a mass has effectively reached a practical upper limit to its velocity in a particular gyrating, structure at a particular gyrating frequency, '303' takes the mass into a new structure with different parameters: gyration frequency, gyration radius, dimensions, etc. Transitioning from one structure to another is another integral part of the '303' patent.

The patent, '303', defines a series of transitions wherein the shape, frequency, radii of gyration are selectively different on the opposing sides of the transition. There are numerous mechanisms defined in the patent to appropriately allow for these variations. In the patent, '303', these transitions are defined as 'Service Loops', terminology to distinguish between these transition 'Service Loop' structures and Delay Loop structures.

Delay Loops and Service Loops allowed for a vast array of configurations, as noted in the '303' patent. The necessary conditions for a stable acceleration within a gyrating system lead the inventors to use shapes with variable localized radii (bowls). However, other shapes can be used provided the initial conditions are satisfied; for example, the initial insertion velocity for a fixed radius (cylinder shape).

While synchronous stages could be designed and controlled, the additional complexities are not required in the designs of the '303' patent. A synchronous design can fail when asynchronous performance occurs. Building components with tolerances to permit synchronous motions of the various stages is possible and may be desirable for some applications. Asynchronous designs are more robust because they assume the components from stage-to-stage can have any phase relationship rather than highly controlled phasing (synchronous).

Conversely, the rotating design in patent application titled "Acceleration and Precision Controlled Ejection of Mass" is less complex from a parts count, but the compromise is the larger dimensions required to achieve the same exit velocity of the accelerated mass, compared to a gyrating system. The only parameters in the rotating design are frequency and length of the rotating hollow tube.

In the rotating design, accelerating the mass a second or third time is not very practical. The insertion into the second, or subsequent, structure (or stage) is going to require controls, defeating the lower parts count advantage. The 2nd or 3rd structure could have been used as the first structure, since the frequency is the only credible parameter.

Gyration designs favor higher frequency and as such compactness, whereas the rotational designs use lower frequencies compatible with larger dimensions. Components capable of supporting higher frequency operations are more plentiful at smaller dimensions. As a practical matter the gyration systems are physically smaller, roughly 2× smaller on at feast 2 of the 3 dimensions, than the spinning-only systems of comparable mass exit velocity.

Gyration-only produces one family of products, spinning-only produces a second family of products, and the coupled spin-gyrate generates a third family of products.

SUMMARY OF THE INVENTION

This is a method of combining rotating and gyrating structures wherein a mass is accelerated. The first acceleration is generated by rotating motion of a tube. The second acceleration is generated by gyrating motion of a cylinder. The combined accelerations of the mass can generate a final velocity of the mass greater than can be achieved by phase-lock techniques.

The tube is selected from the following: a straight tubs or a curved tube. The tube has a ricochet dampening structure attached at the tube's exit. The rotating structure's drive shaft is asynchronous with the gyrating structure's drive shaft. The rotating structure's drive shaft is synchronous with the gyrating structure's drive shaft.

In one embodiment, the synchronous drive shafts are a single shaft. The synchronous motion of the rotating and gyrating structures is accomplished by active mechanisms controlling different drive shafts. The synchronous relationship has a phase offset between the rotating and gyrating structures. In another embodiment, the gyrating structure includes delay loops. The relative angle between the rotating tube and the gyrating structure is selected to accelerate the mass beyond conventional phase-lock velocity. The asynchronous motions of the rotating and gyrating structures are limited by controls to prevent mechanical interference.

BRIEF SUMMARY OF DRAWINGS

FIG. 1 shows the dynamic envelop of gyrating annual ring (cylinder cross section).

FIG. 2 shows a cross section of gyrating cylinder and rotating tube.

FIG. 2B shows a cross section of gyrating cylinder and rotating tube with pillow block hearings.

FIG. 3 shows the air gap and ricochet deflection plates for straight and curved tubes.

FIG. 4B shows the fixed angles and distance between gyration phase and tube exit.

FIG. 4 shows the angles between gyration phase and tubes exits.

FIG. 5 shows a cross section of gyrating bowl and rotating tube.

DETAILED DESCRIPTION OF THE INVENTION

Building a system to accelerate a mass for purposes of performing abrasion, cutting, coating etc., without high pressure fluids or explosives, can be accomplished using rotating or gyrating machinery, as noted in the reference materials. The combined rotating and gyrating can be configured with a rotating machine component feeding its output (a mass accelerated under classic radial force) into a gyrating structure. These two structures can be asynchronous or synchronous. Asynchronous combinations have more complexities due to the randomness of the transition from the rotating components to the gyrating components. Synchronous rotating and gyrating components that are coupled to a common power shaft or mechanically controlled (if driven from multiple power shafts) can provide a very compact, lower parts count solution to the mass acceleration problem as compared to the asynchronous designs of equivalent performance.

Asynchronous designs have the potential to be useless (meaning not capable of significant velocity of the mass at the exit portal) if the design parameters are truly randomly selected or truly random in execution. Careful parameter selection and execution of designs can be done, and interesting and useful devices designed. However, a far less difficult design process occurs with synchronous design approaches.

The key synchronous parameters are the relative phase angle of the rotating and gyrating structures with respect to each other at a given frequency and gyration radius. Selection of a relative phasing angle at a given frequency will result in a 'point-design' solution wherein operations at other frequencies will result in different performance depending upon the phase relation. The gyration radius needs to be within a range compatible with the other parameters as too small of radius of gyration results in insufficient acceleration, while too large of radius of gyration results in an acceleration overrunning the phase lock opportunities. Discovery of the relative relationships of the key parameters and their compatibility for any specific design requires simple geometric calculations, mostly to eliminate mechanical interferences.

Synchronous behavior is most easily described as one power shaft driving both rotation and gyration structures. Mechanical interferences are quickly discovered in designs with a synchronous shared power shaft. Frequency and gyration radius options are somewhat defined by available components. Most bearings are rated at less than several hundred hertz (200 Hz—12,000 revolutions per minute). As the frequency reaches the upper limits, the static and dynamic loads and dimensional barriers defined by those bearings rapidly limit the gyration radius to several inches or less. Magnetic bearings will allow for increases in frequency and dimensions, thus larger and larger machinery will become practical. Specialty designs, where performance is critical, and cost is not a design limiting factor, will be bull with large values for frequency and gyration radius. However, the majority of devices will be utilized for functions where cost is a design driving variable.

In patent '303' the designs are based upon multiple stages at different frequencies. Similarly, this invention can build upon the multiple stages concepts. Each single stage defined by this patent application can be construed as a component to the '303' multi-stage design. The insertion velocity was used as the demarcation between stages in the '303' and a Similar demarcation can occur with this patent application.

A two-subsystem design is offered; subsystem one is rotating and subsystem two is gyrating. Several variations of the two subsystems are provided. Terminology is defined wherein any hollow tube, conduit or other structure, used to accelerate the mass in the rotating reference frame shall be referred to by the single term 'tube'. Likewise, any gyrating structures, cylinder or howl or other form factor, will be referred to by the single term 'cylinder'. In all single stage designs the mass transitions from the rotating frame of reference to the gyrating frame of reference. Multi-stage designs can have transitions to a rotating subsystem from a gyrating subsystem, but these designs will need a higher acceleration profile in subsequent stages to be practical; note the acceleration vector has the gyration radius raised to the first power, and the gyration frequency raised to the 2nd power.

Synchronous design 'air gap' distance, defined as distance between the end of the lube in the rotating frame and the cylinder surface in the gyrating frame, is dependent upon the tube shape (straight tube or curved tube) and the fixed phasing relationship selected between the rotating and gyrating structures.

In asynchronous designs, the 'air gap' distant dependencies are: tube shape, gyration radius, and the specific frequencies of the rotating and gyrating components and any dynamics of those frequencies.

In both synchronous and asynchronous designs, the mass can be guided by cylinder surface properties such as channels or grooves. These guide surfaces can have the appearance of threads. Within a single cylinder the threads can include '303' Delay Loops, as a continuous pathway in multiple planes. Thus, all the phasing benefits of the '303' Delay Loop can be achieved.

Asynchronous Designs:

One variation is a simple straight rotating tube accelerating a mass to an uncontrolled transition, asynchronous, onto the gyrating cylinder surface. The mass departing the tube can: (a) ricochet off the gyrating cylinder surface, (b) capture onto the gyrating cylinder surface then slow due to insufficient acceleration from the gyrating cylinder surface and fall out of phase with the gyrating cylinder surface, or (c) capture onto the gyrating cylinder surface and accelerate with the gyrating cylinder surface.

Ricochets can be managed with containment structures. Some energy (velocity) will be lost as ricochet events are dampened. Even if the ricochets are controlled the probability of satisfying the velocity conditions for capture on a stable acceleration zone of the gyrating cylinder are random due to the asynchronous nature of the motions of the tube and cylinder. Too little insertion velocity from the tube to the cylinder dooms the mass to an ever-decreasing velocity until it comes to rest.

When the mass' velocity upon capture onto the cylinder is sufficient then additional velocity can be added by favorable phasing. The magnitude of the added velocity is dependent upon the relative phasing of the mass to the cylinder's maximum acceleration vector position.

Two options exist for a mass captured onto the cylinder with favorable phasing: exit from the cylinder surface after adding some velocity (magnitude range is between insertion to a value greater than phase lock) or phase-lock if allowed to reside on the cylinder surface.

If phase lock is achieved the mass is moved into re-phasing structures (Delay Loops) to add velocity beyond the classical Phase-lock velocity of a gyrating structure.

Asynchronous motions between the tube and cylinder will result in an ever-changing dynamic envelope as the phase relationship changes as shown in FIG. 1; Dynamic Envelop of Gyrating Annual Ring (Cylinder Cross Section). This dynamic envelope will decrease with decreasing radius of gyration for any given cylinder inner diameter.

In an asynchronous design, such as a gear driven gyration at a frequency different from the rotational frequency, any rotating object within the volume of the right circular cylinder shown in FIG. 1 will need to accommodate the full dynamic envelope, otherwise a mechanical interference would occur. Object 210 in FIG. 2, Cross-section of Gyrating Cylinder & Rotating Tube, could be gear driven at the shaft-to-cylinder interface; in which case tolerance issues could eventually, after a number of rotation cycles, lead to asynchronous motions between the tube and cylinder.

Transitions between asynchronous accelerating devices, rotating tubes and gyrating surface, can be made to work within limits. For very small gyration radius systems the physical gap between the rotating tube and the gyrating surface can be 'small' at closest approach and 'small' plus a distance equal to 'twice the radius of gyration' at the farthest separation. In either case the biggest concern will be a ricochet event.

Shaping the tube has a significant impact on the probability of a ricochet. A curved tube, 305-C shown in FIG. 3, Air Gap & Ricochet Deflection Plate for Straight and Curved Tubes, can guide the mass toward a gyrating surface. Asynchronous motions between the tube and gyrating surface wilt change the glancing angle at the moment the mass touches the gyration surface.

A deflection plate, 305-CS shown in FIG. 3, Air Gap & Ricochet Deflection Plate for Straight and Curved Tubes, attached to the end of the tube, can modulate the ricochet if it occurs; which it will most of the time, but sometimes the angles line up and the ricochet does not occur.

The frequencies of the tube and cylinder can have significant influence upon the probability of a favorable phase event happening as the mass transitions from the rotating tube to the gyrating cylinder surface. By design, the values for the frequencies of rotation and gyration should be very similar, perhaps off by small fractions of one percent. In any asynchronous design some crude frequency governor should be employed, even if the absolute relative frequencies are not tightly controlled. If the tube is rotating at the higher frequency then the mass' insertion velocity can be greater than the stable phase look for the gyrating surface, allowing for a larger angle of phase space wherein the lock can occur. Conversely, if the gyrating frequency is higher than the rotating frequency, then the range of angles for phase lock decreases. Another variable in the mass' exit velocity from the tube is the mass' insertion velocity at the tube's entrance; if there is a significant insertion velocity then the mass' tube exit velocity can effectively dominate the effects of the relative frequencies of the rotating and gyrating subsystems.

All of these asynchronous design limitations can be overcome with a synchronous design wherein the tube and cylinder are locked in a fixed relationship.

Synchronous Designs

A more controlled configuration has a rotating tube synchronous with the gyrating cylinder, and by definition providing sufficient velocity to the mass to capture onto the gyrating surface. The mass will depart the tube near the gyrating surface and since the tube is synchronous with the gyrating surface the acceleration inside the tube will generate a velocity just slightly smaller than the adjacent gyrating surface (difference in distance from the exit end of the tube and the gyrating cylinder surface is the 'air gap'). With correct phasing the slightly lower velocity can be made up after the mass is captured on the gyrating surface. A series of gyration motion induced accelerations are used to achieve a final velocity, including Delay Loop re-phasing, to accelerate the mass beyond the phase-looked velocity. The 'air gap' distance is fixed in magnitude as the tube is moving at the frequency of rotation, from one interaction with an isolated portion of the gyrating surface to another interaction with a different isolated portion of the gyrating surface, shown in FIG. 4B, Fixed Angles Distance between Gyration Phase & Tube Exit. As the phase of the gyration moves, the absolute distance of each portion of the cylinder is moving with respect to the rotation axis; the absolute distance is twice the gyration radius per rotation of the rotation axis. This change in distance is at a constant rate, defined by the gyration frequency, which happens to be the rotation frequency.

In a synchronous design, the frequency of the rotation and the frequency of the gyration are identical, the dynamic envelope of the gyrating structure is fixed for a given rotation position, and the rotating object's tip position is matched to the local position of the gyrating surface. The power shaft rotates the tube and the local gyrating surface, thereby the dynamic envelope is an instantaneous dynamic envelope. In this 'matching' mechanical design approach the mass can be selectively phased as it transitions from the rotating tube onto the gyrating surface. This first rephasing can be used to effectively boost the mass to a velocity in excess of the phase-locked velocity of the cylinder. Subsequent additional delay loop re-phrasing can be used to add more velocity to the mass.

The angle ABC in FIG. 4, between the synchronous tube, 405S, and cylinder' gyration phase, is fixed by mechanical attachments at the drive shaft, 402. The cylinder's attachment is defined by object 410, gyration radius structure, relative to the center of rotation of shaft 402. Curved Tube, 405C, has a similar angle, ABD. The gyration radius is defined by the offset of the gyration device, 410, from the power shaft, 402. The center of the objects 402 and 410 are basis for line segment BA. Line segment BC is from the center of the power shaft, 402, to the end of the straight tube, 405S. Line segment 80 is from the center of the power shaft, 402, to the end of the curved tube, 405C.

If the tube is curved, the dimensions of the mass can be larger than the 'air gap' provided that the pathway of the mass, on the inner wall of the cylinder, item 316 in FIG. 3, is restricted to not return to that location in a subsequent cycle of acceleration, as a mechanical interference of the mass with the tube would occur in that event. Non-curved tubes should be designed to allow a sufficient distance between the end of the tube and the gyrating surface to permit the mass to exit the tube without getting wedged between the tube and the gyrating surface. In any case, the dimensions of the mass also define the minimum separation, shown in FIG. 3, of the ricochet deflection plate, 305-SS to inner wall of cylinder, 316, or in the case of a curved tube the ricochet deflection plate, 305-CS to inner wall of cylinder, 316.

FIG. 3 shows a simple curved, and a straight tube, 305S, within a gyrating cylinder (showing an instantaneous position of the gyration cycle). The curved tube is shown with a smaller 'air gap' than the straight tube.

In the previous gyration patent, '303', a transition between stages is managed by Service Loop mechanisms built as inter-stage transfer functions.

No mechanism is required in a single stage rotation-to-gyration transition provided the rotation and gyration frequency are driven by the same rotating shaft or controlled as if they were driven by one rotating shaft. Obviously, the single rotating shaft is preferred because fewer parts and absolutely no controls are required, except for fabrication controls. Nominal tolerance between the rotating tube and the gyrating surface is sufficient to transition the mass.

Complex controls allow for effective phase controls over different rotating and gyrating structures. With indexing, optical encoders for example, and a processing capability to adjust the motor rotation rates, independent motors and the shafts they drive can maintain a phase relationship, as if these two independent shafts were one shaft. Degrees of sophistication, or lack thereof, occur in the control logic and actuators, based upon the absolute magnitude of the positional differences between nearly synchronous moving assemblies. Some mechanical configurations of nearly synchronous subassemblies with sufficient control of position and rotation rates of the moving pans can be treated as synchronous equivalent devices for these acceleration purposes.

Initial cylinder phasing, with respect, to the tube phase angle, defined by the relative attachments of the cylinder and tube to the rotating shaft can be shown to have different power demands as a function of the rate of the acceleration. When lower acceleration functions happen, based upon tube and cylinder phase selections, the overall power demand can be managed. For example, over a 90-degree spread in phase relationships between the cylinder and tube, it can be shown that an excess of 20% difference can occur in the exit velocity, and these velocities can be achieved in less than 2 rotation periods or almost 3 rotation periods, calculations assume friction is ignored, which is not too unrealistic for some mass types (ball bearings on a hard-smooth surface), and air resistance is also ignored. The air mass is accelerated with the other 'mass' types so this assumption: is also not unrealistic as long as the velocity regime is sub-sonic and smooth surfaces keep eddy currents to a minimum.

DETAILED DESCRIPTIONS OF FIGURES

FIG. 1, Dynamic Envelop of Gyrating Annual Ring (Cylinder Cross Section), shows four discrete positions (111, 112, 113, and 114) caused by gyration of the right circular cylinder. The four surfaces are overlapped with one surface uncovered, surface 111, and three partially covered surfaces, 112 and 113 and 114, where surface 114 is the most covered. As the cylinder is gyrated the cross-section shifts its position relative to a fixed reference (the observer). The four overlapping cross-sections are four instantaneous views. Over a full gyration period, the areas swept out would define an annular ring with an inner diameter defined by the original right circular cylinder's inner diameter reduced by twice the radius of gyration, and the outer diameter of the swept area defined by the cylinders outer diameter plus twice the radius of gyration.

FIG. 2, Cross section of Gyrating Bowl & Rotating Tube, of System 200, starts with the motor, 201, and its drive shaft, 202. Two objects are connected to the drive shaft 202, the gyration shaft, 210, and the rotating tube, 205. Connected to the gyrating shaft, 210, is the gyrating structure, 215, including a base and the cylinder shape structure with an inner surface, 216, and four instances of channels, 217A, 217B, 217C, and 217D, on the inner surface, 216. A mass feed tube, 222, is coupled via a rotating joint of some nature (many available) to the tube, 205. The mass feed tube, 222, is supplied from the feed hopper, 223, which in turn is supplied from an outside source via the portal, 224.

In operation the motor, 201, drives the shaft, 202, shaft rotates causing the tube, 208, to rotate, and the shaft, 202, drives the gyration shaft, 210, connected to the cylinder, 215, wherein the cylinder gyrates. Mass enters the tube, 205, from a mass feed tube, 222, supplied from a hopper, 223. Hopper, 223, and its feed can be completely outside the safety enclosure of device, 200.

Not shown, for clarity, are several additional features of device 200, including a ricochet plate, Delay Loop(s), and the exit port where the mass departs the device, 200.

FIG. 2B, Cross-section of Gyrating Cylinder & Rotating Tube with Pillow Block Bearings, shows another version of a rotating tube and gyrating cylinder, with an additional structure, Pillow Block Bearings. System, 460, has a motor, 230, with a complex shaped shaft, 231, with four connection nodes, the tube, 232, and a bearing, 255, inside the gyrating cylinder, 235, and two pillow block bearings, 245a and 245B. These pillow block bearings are used to isolate the motor bearings from the wobble induced by the gyrating structure and mass moving through the system. Tube, 232, is shown at an 'offset' angle from the gyration angle, thus the tube looks short, in a top view the tube, 232, would have a close approach to a portion of the cylinder's inner surface, 236. This particular tube is potentially multiple internal tubes, and as such there could be multiple channeling structures. Also shown on the cylinder inner surface, 236, are four channel locations, 237A, 237B, 237C, and 237D.

Mot shown are the features noted in the previous paragraphs, feed source components, exit port(s), ricochet plate, and the Delay Loops.

FIG. 3, Air Gap & Ricochet Deflection Plates for Straight and Curved Tubes, shows a central drive shaft, 302, connected to a gyration device, 310, which is connected (not shown for clarity) to the cylinder, 315, with its inner surface, 316. Two representative tubes, tube 305-S (straight) with its ricochet deflection plate, 305-SS, and tube 305-C (curved) with its ricochet deflection plate, 305-CS. This position location of the cylinder, 315, is the instantaneous view.

In operations the drive shaft, 302, would be connected to a motor and its control electronics (not shown). The shaft would ramp up to speed, start feeding mass into the rotating tube(s), 305-S and/or 305-C, these mass units would be transferred onto the gyrating cylinder inner wall, 318, guided by channels (not shown), to a Delay Loop (not shown) unique to each tube, and eventually to exit(s) unique to each gyrating channel/tube combination (not shown).

Each tube, and there can be many, could carry a different type of mass, isolated by channeling on the cylinder inner wall. Exits for each type of mass can be isolated, and the mass directed by isolated applicator devices. Each applicator device will need to accommodate the motion induced by gyrating components feeding the applicator devices.

FIG. 4B, Fixed Angles & Distance between Gyration Phase & Tube Exit, has a rotating shaft centered on the origin (X=0, Y=0), and a gyration radius orientation defined by two positions, each represented by a small arrow, 611 on the −X axis, and 621 on the +Y axis. These two arrow positions reflect a 90-degree gyration position change of the cylinder; which occurs as the power shaft is rotated 90 degrees. A single rotating tube is shown at two rotation positions, 90 degrees apart, as 613 and 623. Each tube has a respective exit port, 613E and 623E. The tubes are shown as 60 degrees behind the corresponding phase angle of the gyrating cylinder surface, tube position 613 is 60 degrees behind cylinder surface 612. The second instantaneous position for the cylinder surface is 622, 90 degrees after the instantaneous position 612, and 60 degrees in front of the tube at 623.

On cylinder 612 there is a position, 612S, that is the closest point to the exit, 613E, of tube 613. The distance between the exit, 613E and cylinder surface, 612S, is identical to their corresponding 623E and 622S; within fabrication tolerances. This relatively simple diagram demonstrates the instantaneous dynamic envelope concept.

FIG. 4, Angles between Gyration Phase & Tubes Exits, shows several tubes, 405S and 405C, connected to a rotating shaft, 402, with a center point labeled as 'B'. Three lines are formed with point 'B' at one end of each. Line AB connects the center of the instantaneous position of the gyration axis, 410, with the center of the rotating shaft, 402. Line BC connects the exit of the straight tube, 405S, to the center of the rotating shaft, 402. Line BD connects the exit of the curved tube, 405C, to the center of the rotating shaft, 402. These lines are instantaneous positions used to define the forces acting upon a mass.

FIG. 5, Cross section of Gyrating Bowl & Rotating Tube, reflects a different form factor. System 10 has a shaft, 110, connected to a tube, 130, and a gyration bearing, 120. Deflector plate, 135, is connected to the tube, 130, these objects all rotate with the shaft. The gyration bearing, 120, causes the bowl base, 15, the bowl, 155, the Delay Loop structures, 160 and 165, to gyrate.

The invention claimed is:

1. A method of combining rotating and gyrating structures wherein a mass is accelerated, first acceleration is generated by rotating motion of a tube, second acceleration is generated by gyrating motion of a cylinder, where the combined accelerations of the mass can generate a final velocity of the mass greater than can be achieved by phase-lock techniques.

2. A method of claim 1 wherein the tube is selected from the following: a straight tube, a curved tube.

3. A method of claim 2 wherein a tube has an exit and the tube has a ricochet dampening structure attached at the tube's exit.

4. A method of claim 1 wherein the rotating structure has a drive shaft;
   wherein the gyrating structure has a drive shaft; and
   wherein the rotating structure's drive shaft is asynchronous with the gyrating structure's drive shaft.

5. A method of claim 4 wherein the asynchronous motions of the rotating and gyrating structures are limited by controls to prevent mechanical interference.

6. A method of claim 1 wherein the rotating structure has a drive shaft;
   wherein the gyrating structure has a drive shaft; and
   wherein the rotating structure's drive shaft is synchronous with the gyrating structure's drive shaft.

7. A method of claim 6 wherein the synchronous drive shafts are a single shaft.

8. A method of claim 6 wherein the synchronous motion of the rotating and gyrating structures is accomplished by active mechanisms controlling different drive shafts.

9. A method of claim 8 wherein the relative angle between the rotating tube and the gyrating structure is selected to accelerate the mass beyond conventional phase-lock velocity.

10. A method of claim 6 wherein the synchronous relationship has a phase offset between the rotating and gyrating structures.

11. A method of claim 1 wherein the gyrating structure includes delay loops.

\* \* \* \* \*